Nov. 17, 1953 H. W. BALZER ET AL 2,659,771

AUTOMATIC SWITCH FOR TELEPHONE SYSTEMS

Filed Aug. 25, 1950 3 Sheets-Sheet 1

INVENTORS
Harvey W. Balzer
Pier Bakker
BY Smith, Olsen and Baird
Attys.

AUTOMATIC SWITCH FOR TELEPHONE SYSTEMS

Filed Aug. 25, 1950 3 Sheets-Sheet 2

INVENTORS
Harvey W. Balzer
Pier Bakker
BY Smith, Olsen & Baird
Attys.

Nov. 17, 1953 H. W. BALZER ET AL 2,659,771

AUTOMATIC SWITCH FOR TELEPHONE SYSTEMS

Filed Aug. 25, 1950 3 Sheets-Sheet 3

INVENTORS
Harvey W. Balzer
Pier Bakker

BY Smith, Olsen & Baird.
Attys.

Patented Nov. 17, 1953 2,659,771

UNITED STATES PATENT OFFICE 2,659,771

AUTOMATIC SWITCH FOR TELEPHONE SYSTEMS

Harvey W. Balzer, Downers Grove, and Pier Bakker, Chicago, Ill., assignors to Automatic Electric Laboratories, Inc., Chicago, Ill., a corporation of Delaware Application August 25, 1950, Serial No. 181,511

11 Claims. (Cl. 179—18)

Figures 1, 2:
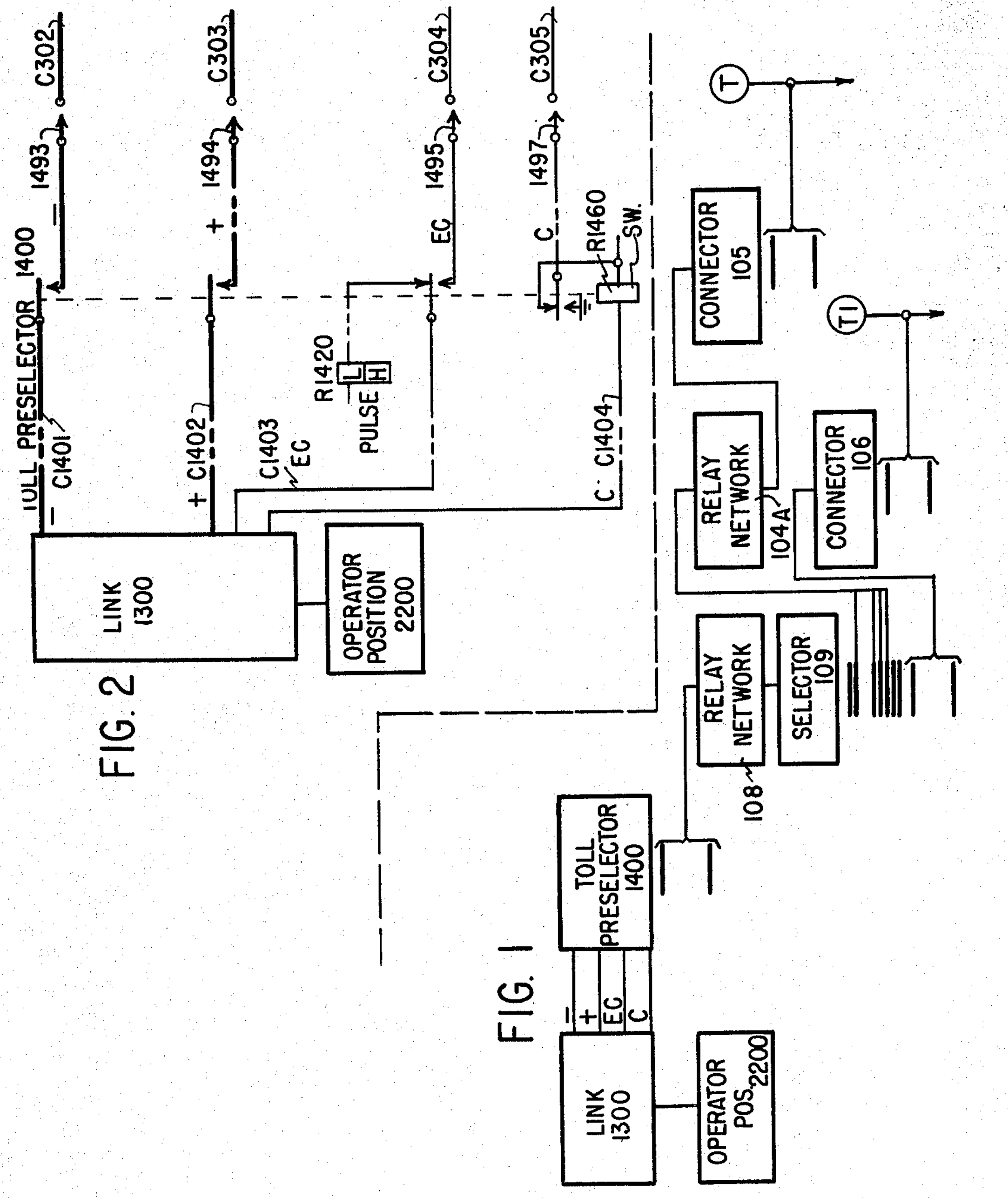

The present invention relates to automatic telephone systems in general, but is concerned more particularly with improvements in automatic switching apparatus to be utilized in completing connections to called subscriber substations from a dial toll switchboard of the type disclosed in the copending Balzer application, Serial No. 181,508, filed August 25, 1950.

In a telephone system provided with a dial toll switchboard of the type disclosed in the above mentioned Balzer application, telephone connections are completed from the switchboard by means of a key controlled impulse sender. This impulse sender is arranged to transmit switch setting impulses to an automatic switch associated with a link at the position over the same EC conductor that is utilized to return various supervisory signals to the toll operator position. When a dial toll switchboard of the type noted is installed in an existing telephone exchange equipped with automatic switching apparatus of the type which is controllable by loop type switch setting impulses and which is also arranged to return loop type supervisory signals, it is normally necessary to remove such switching apparatus and replace the same with EC type impulsing and supervisory switching apparatus.

Accordingly, the principal object of the present invention is to provide in a telephone system of the type noted a relay network arranged to permit EC type impulsing and supervisory switching apparatus to be utilized in an existing telephone exchange equipped with loop type impulsing and supervisory switching apparatus in order to avoid the necessity of replacing such existing equipment.

It is another object of the invention to provide in a telephone system of the type noted, a relay network which is adapted to receive EC type impulses from the impulse sender at the dial toll switchboard and to convert such impulses into loop type impulses in order to control the setting up of connections.

It is still another object of the invention to provide in a relay network of the type noted above, facilities for converting loop type supervisory signals returned thereto into EC supervisory signals in order to transmit such signals to the toll operator position.

It is a further object of the invention to provide in a telephone system an improved automatic switch which is arranged to receive and transmit control signals over the EC conductor of an incoming trunk line and which is also arranged to receive and transmit control signals over the line conductors of an outgoing trunk line.

It is a still further object of the invention to provide in a telephone system an improved automatic switch which is arranged to be controlled by EC impulsing, which is arranged to control subsequent automatic switches of the loop impulsing type and which is arranged to return loop type supervisory controls received thereat over the EC impulsing conductor.

Further features of the invention pertain to the particular arrangement of the circuit elements of the relay network and the automatic switches whereby the above-outlined and additional operating features thereof are attained.

Figure 3:
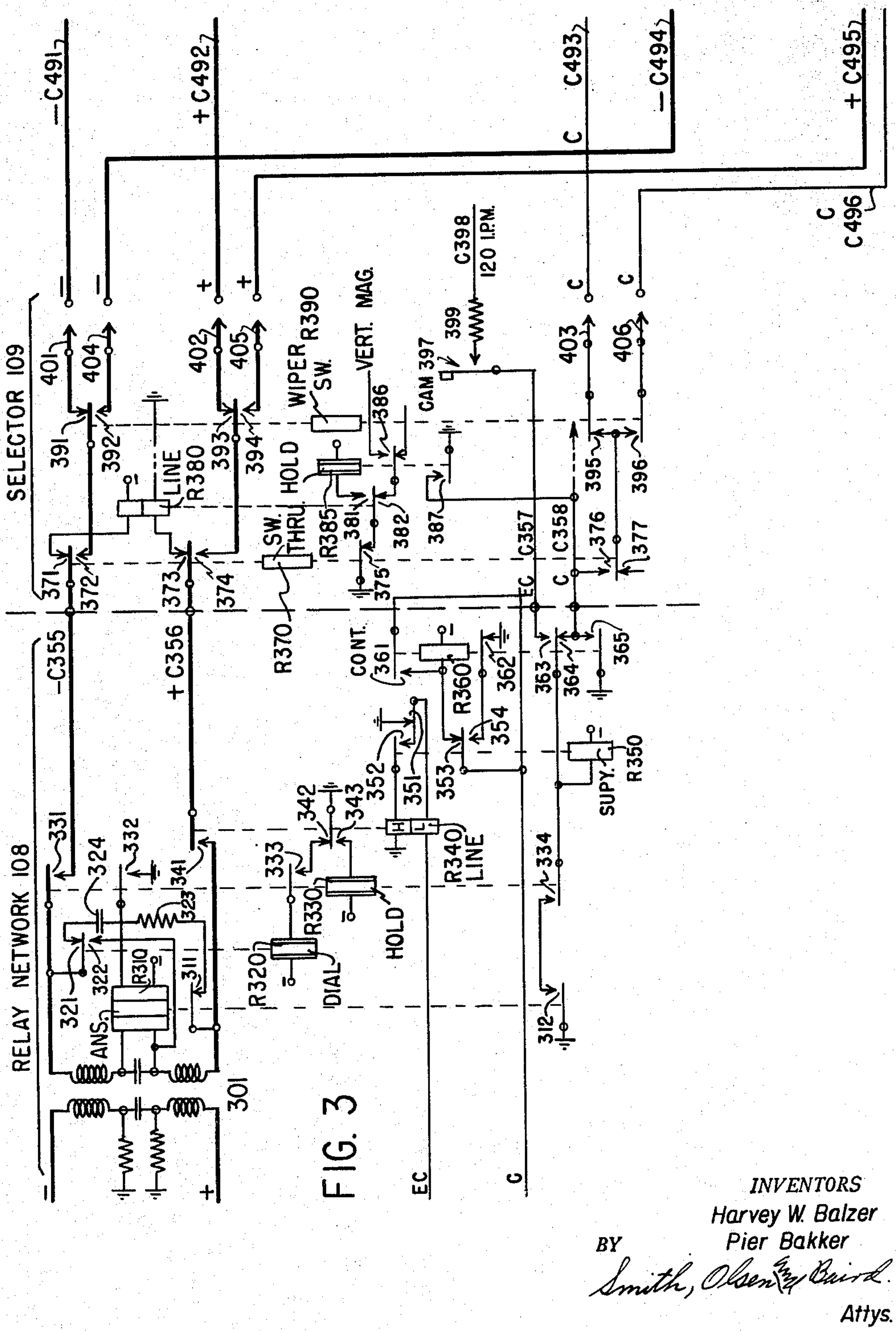
Figure 4:
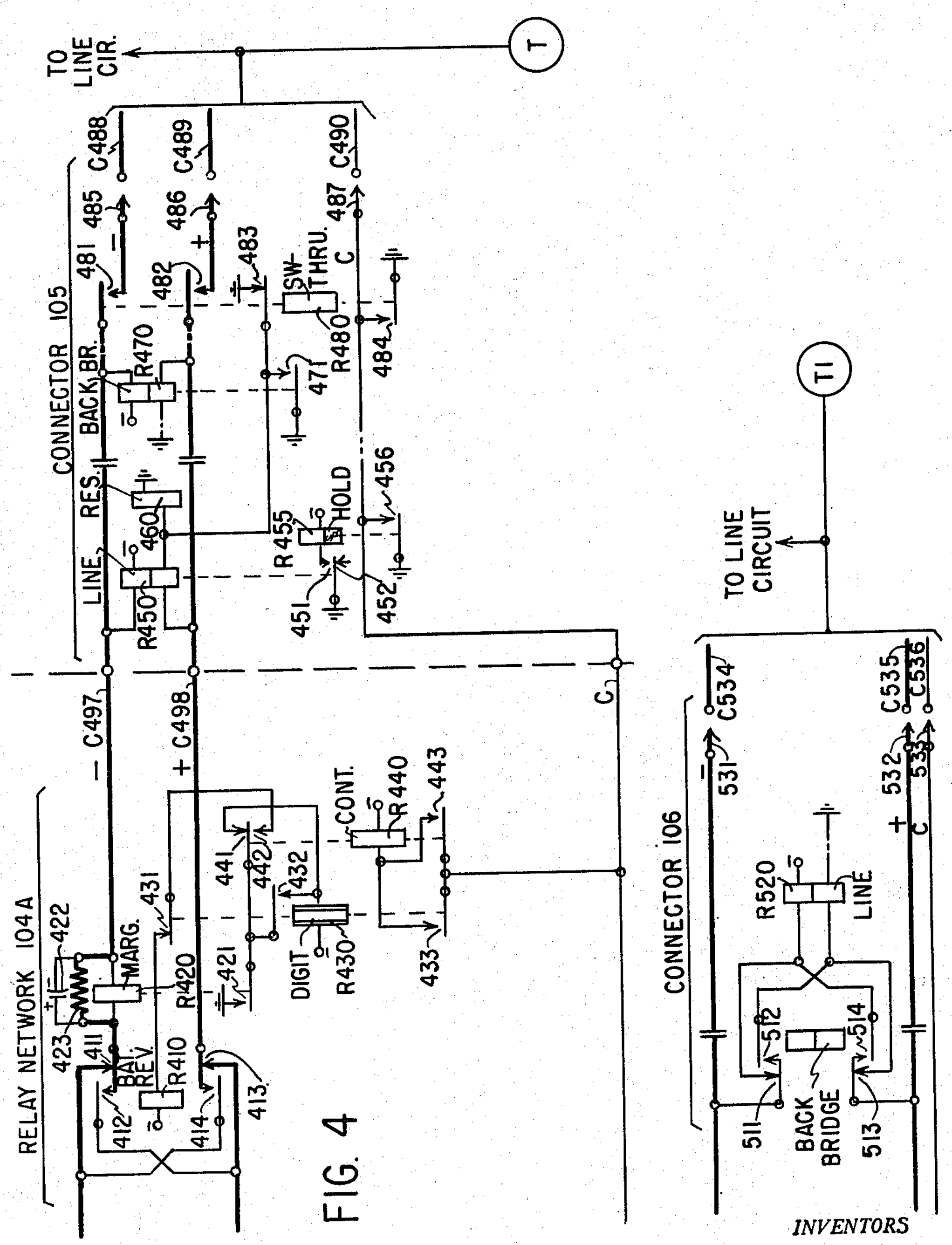

The invention, both as to its organization and method of operation, together with further objects and advantages thereof, will best be understood by reference to the following specification taken in connection with the accompanying drawings, in which Figure 1 is a schematic trunking diagram illustrating portions of a switch train embodying the present invention; Fig. 2 schematically illustrates an operator position at a dial toll switchboard, a link thereat and an individually associated toll preselector over which connections may be established by the toll operator to an idle one of a plurality of selectors, one of which is disclosed in Fig. 3; Fig. 3 shows the details of a relay network and such portions of a selector, individually associated therewith, as are deemed necessary for an understanding of the invention; and Fig. 4 shows the details of a relay network and such portions of a connector, individually associated therewith, as are deemed necessary for an understanding of the invention. Fig. 4 also shows such portions of another type of a connector as are deemed necessary for an understanding of the invention and a plurality of a called subscriber substations accessible to the illustrated connectors.

Referring now more particularly to Fig. 1, it should be noted that the operator position 2200 and the impulse sender thereat (not shown), the link 1300 and the toll preselector 1400 are the same as the corresponding apparatus described and illustrated in the above mentioned Balzer application. The selector 1600 is of the well-known Strowger type which is selectively operable under control of the impulse sender to raise its wiper set step-by-step in a vertical direction in accordance with the impulses transmitted thereto and which is thereafter automatically operable to rotate its wiper set to find and select an idle trunk line terminating a relay network, such as 108, and an associated selector, such as 109. The selector 109 is also of the well-known Strowger type having two wiper sets which are selectively operable step-by-step in a vertical direction in accordance with impulses transmitted thereto and which are automatically operable in a rotary direction to find and select an idle trunk line terminating a relay network, such as 104A, and an associated connector, such as 105, if one of the wiper sets is effective or to find and select an idle trunk line terminating a connector, such as 106, if the other wiper set is effective. The selector 109, for example, may be of the type disclosed in Fig. 1 of the copending Bakker application Serial No. 181,510, filed August 25, 1950. The connectors 105 and 106 are also of the well-known Strowger type having wiper sets which are respectively selectively operable step-by-step in both a vertical and a rotary direction to select particular called subscriber lines. These connectors may, for example, be of the type disclosed in Fig. 60 of the text book entitled "Automatic Telephony," second edition, written by Arthur Bessey Smith and Wilson Lee Campbell and published in 1921 by the McGraw-Hill Book Company Inc., New York, N. Y. It should be noted, however, that the connector 105 has been modified to selectively connect a high resistance to the line conductors for the purpose of returning supervisory controls to the calling toll operator instead of returning reverse battery supervisory controls over the line conductors in accordance with conventional operation as is disclosed in the connector 106.

In order more clearly to set forth the novel features of the invention disclosed in Figs. 2, 3 and 4, it will first be assumed that the operator attending the operator position 2200 desires to extend a connection to the subscriber at substation T. It will also be assumed that the operator has selected the link 1300 and has registered appropriate digits in the impulse sender at her position for routing the connection via the toll preselector 1400, the relay network 108, the selector 109, the relay network 104A and the connector 105 to the called subscriber line. As is described in detail in the above mentioned Balzer application, the impulse sender at the operator position transmits impulses corresponding to the first registered digit over the EC conductor C1403 to the pulse relay R1420 in the toll preselector 1400 and it applies ground potential to the C conductor C1404 in order to hold the selector 1400 from the operator position. The pulse relay R1420 in response to the impulses of the first digit transmitted thereto controls the vertical magnet (not shown) to raise the wiper set comprising the — and + line wipers 1493 and 1494, the EC wiper 1495 and the C wiper 1497 step-by-step in a vertical direction to a level in the associated bank contact set corresponding to the number of impulses of the first digit. Thereafter, the rotary magnet (not shown) of the selector 1400 is automatically controlled to rotate the wiper set over the individual contacts in the selected level to search for and seize an idle trunk line extending to a relay network and an associated selector, such as the relay network 108 and the selector 109.

The relay network 108, which is individually associated with the selector 109, is marked as idle to the selector 1400 by an absence of ground potential and a presence of battery potential, through the winding of a control relay R360, on the C conductor C305. It will be assumed that the wiper set of the selector 1400 seizes the idle relay network 108 over the trunk line comprisinng the —, +, EC and C conductors C302 to C305, inclusive. When this occurs, the switching relay R1460 is operated in the selector 1400 thereby to connect the —, + and EC conductors C1401, C1402 and C1403 via the wipers 1493, 1494 and 1495 to the conductors C302, C303 and C304. Also, the relay R1460 applies a holding ground potential via the wiper 1497 to the C conductor C305 and it disconnects the pulse relay R1420 from the EC conductor C1403. The pulse relay R1420 in the selector 1400 now restores to normal and the switching relay R1460 is held in its operated position by the ground potential applied to the C conductor C1404 from the calling operator position.

Referring now to the relay network 108, it will be seen that the ground potential applied to the C conductor C305 of the incoming trunk line completes a circuit, including the contacts 353, for operating the control relay R360. As soon as the relay R360 operates it locks itself via its contacts 361 to the grounded conductor C305. As a further result of the operation of relay R360, at its contacts 365, it applies ground potential to the C conductor C358 extending to the selector 109. As a further result of the seizure of the relay network 108, a circuit is completed for operating the line relay R340 via its low resistance lower winding. More specifically, as soon as the toll preselector 1400 seizes the relay network 108 and connects the EC conductor C1403 to the EC conductor C304 the battery potential applied thereto by the impulse sender at the operator position 2200 is extended via the resistance lower winding of the line relay R340 to ground at contacts 351. Consequently, the line relay R340 now operates and completes an obvious circuit for operating the slow-to-release hold relay R330. As soon as the hold relay R330 operates, it completes, at its contacts 332, an obvious circuit for energizing the right hand winding of the shunt field answer relay R310 but this relay will not operate its contacts 311 and 312 until the current flow through the circuit for energizing the left hand winding is in the proper direction. As a further result of the operation of the hold relay R330, it completes a loop circuit, at its contacts 331, for operating the line relay R380 in the selector 109. The last mentioned circuit may be traced from ground potential in the selector 109 via the lower winding of the line relay R380, the contacts 373, the + line conductor C356, the contacts 341, the lower right hand winding of the repeating coil 301, the left hand winding of the answer relay R310, the upper right hand winding of the repeating coil 301, the contacts 331, the — line conductor C355, the contacts 371 and the upper winding of the line relay R380, to battery. It should be noted that the above traced loop circuit completes an energizing circuit for the left hand winding of the answer relay R310 and the upper and lower windings of the line relay R380. The line relay R380 operates, but the current flow through the left hand winding of the answer relay R310 is in such a direction that it opposes the energizing circuit of the right hand winding of the relay and prevents it from operating. In response to the operation of the line relay R380, an obvious circuit is completed for operating the hold relay R385 and the latter relay, at its contacts 386, prepares a point in the circuit for transmitting switch setting impulses to the vertical magnet of the selector 109. As a further result of the operation of relay R385, at its contacts 387, it applies a multiple holding ground potential to the C conductor C358.

The relay network 108 and the selector 109 are now in condition to respond to the second digit transmitted by the impulse sender at the operator position 2200. Consequently, the second digit transmitted by the impulse sender interrupts the circuit for the line relay R340 which relay restores and reoperates the same number of times as the number of impulses in the digit transmitted. Upon the first restoration of the line relay R340, it completes a circuit via the contacts 342 and 333 for operating the dial relay R320 and, at its contacts 341, it interrupts a point in the previously traced loop circuit for controlling the line relay R380. As soon as the dial relay R320 operates, it completes, at its contacts 322, a circuit for removing the impedance of the upper right hand winding of the repeating coil 301 and the left hand winding of the answer relay R310 from the previously traced loop circuit. The dial R320 is of the slow-to-release type and remains in its operated position during the impulsing operation of the line relay R340. It should also be noted at this time that the hold relay R330 is also of the slow-to-release type and consequently, remains in its operated position during the impulsing operation of the line relay R340. Each time the loop circuit for the line relay R380 is interrupted at the contacts 341, the relay restores to normal and transmits, at its contacts 382, impulses to the vertical magnet (not shown) of the selector 109. Each time the contacts 341 are closed, the line relay R380 reoperates and interrupts, at its contacts 382, the circuit for the vertical magnet. The hold relay R385 is of the slow-to-release type and consequently, remains in its operated position during the impulsing of the line relay R380. In this manner, the impulses received over the EC conductor C304 control the line relay R340 and the latter relay, at its contacts 341, controls the line relay R380 to control the vertical magnet of the selector 109 to raise the wiper sets step-by-step in a vertical direction. The two wiper sets comprising the —, + and C wipers 401, 402 and 403 and the —, + and C wipers 404, 405 and 406 are raised to a level of the associated set of bank contacts terminating an idle trunk line extending to the relay network 104A and the individually associated connector 106. Therefore, the rotary magnet (not shown) of the selector 109 is automatically operated in the manner described in the above mentioned Bakker application to step the wiper sets in a rotary direction to search for an idle trunk line. In the present example, it will be assumed that the wiper switching relay R390 remains in its normal unoperated position in order to render the first wiper set comprising the wipers 401 to 403, inclusive, effective during the rotary stepping operation.

Attention is directed to the fact that the rotary stepping of the wipers of the selector 109 takes place at the end of the series of impulses of the second digit of the called number transmitted to the relay network 108. At the end of the last impulse of the series, the line relay R340 remains in its operated position in order to maintain the loop circuit for the line relay R380, at its contacts 341, and in order to retain the slow-to-release hold relay R330 in its operated position. However, at its contacts 342, the relay R340 interrupts the circuit for the dial relay R320 which relay now slowly restores to normal. As soon as the relay R320 restores to normal, it interrupts, at its contacts 322, the previously described circuit for short-circuiting the upper right hand winding of the repeating coil 301 and the left hand winding of the answer relay R310. Also, at its contacts 321, the relay R320 connects the line termination network comprising the condenser 324 and the resistance 323 across the upper and lower right hand windings of the repeating coil 301 in order to dissipate any voltage change that may have been accumulated in the windings of the repeating coil 301 and the condenser therebetween.

Referring now to the relay network 104A (Fig. 4), it will be seen that the incoming trunk line comprises the —, + and C conductors C491, C492 and C493. The conductor C493 is marked with a ground potential in the event that the relay network 104A and the connector 105 are busy and the conductor is marked by an absence of potential when the relay network 104A and the connector 105 are idle. A busy marking ground potential on the C conductors of busy trunk lines encountered by the wiper 403 during the rotary stepping of the selector 109 completes a circuit via the contacts 395 and 377 for automatically stepping the wiper sets to the next set of contacts in the selected level. When an idle trunk line is encountered, such as, for example, the trunk line extending to the relay network 104A, the automatic stepping of the wiper sets of the selector 109 is terminated and the switchthrough relay R370 is operated. At this time, the wipers 401, 402 and 403 are in engagement with the conductors C491, C492 and C493 respectively and the switchthrough relay R370 is in its operated position. As soon as the switchthrough relay B370 operates, it disconnects, at its contacts 371 and 373, the loop circuit in the relay network 108, including the conductors C355 and C356, from the line relay R380 and, at its contacts 372 and 374, it connects the loop circuit via the contacts 391 and 393 and the wipers 401 and 402 to the conductors C491 and C492. As a further result of the operation of the switchthrough relay R370, at its contacts 375, it interrupts the circuit for the hold relay R385 which now restores to normal and, at its contacts 387, disconnects one of the multiple holding ground potentials from the C conductor C358. Finally, at its contacts 376, the switchthrough relay R370 connects the ground potential, at contacts 365, via the C conductor C358, contacts 376 and 395 and the C wiper 403 to the C conductor C493.

In view of the foregoing, it will be understood that when the selector 109 seizes an idle trunk line extending to a relay network, such as 104A, and switches through, the loop circuit of the relay network 108 is connected to the seized idle trunk line and the holding ground potential on the C conductor C358 is forwarded to the C conductor of the seized idle trunk line. It should be noted, however, that the ground potential applied to the C conductor C358 also holds the selector 109 in its operated position by retaining the switch-through relay R370 operated.

Referring now to the connector 105, illustrated in Fig. 4, it will be seen that when the loop circuit of the relay network 108 is connected to the incoming trunk line conductors C491 and C492 a circuit is completed for operating the marginal relay R420 in the relay network 104A in series with the upper and lower windings of the line relay R450 in the connector 105. The last mentioned circuit may be traced from battery via the upper winding of the line relay R450, the — conductor C497, the winding of the marginal relay R420 (connected in multiple with the resistor 423 and the electrolytic condenser 422), the contacts 411, the — conductor C491, the wiper 401, the contacts 391 and 372, the — conductor C355, the contacts 331, the upper right hand winding of the repeating coil 301, the left hand winding of the answer relay R310, the lower right hand winding of the repeating coil 301, the contacts 341, the + conductor C356, the contacts 374 and 393, the wiper 402, the + conductor C492, the contacts 413, the + conductor C498, the lower winding of the line relay R450 and the contacts 483, to ground. The line relay R450 in the connector 105 operates over the above traced loop circuit and, at its contacts 451, completes an obvious circuit for operating the hold relay R455. The last mentioned relay prepares a point in the conventional stepping circuit for controlling the vertical magnet (not shown) of the connector 105 and, it also completes, at its contacts 456, a circuit for returning ground potential to the C conductor C493. At the present time, the connector 105 is in condition to receive the last two digits transmitted by the impulse sender at the operator position 2200.

Referring to the relay network 104A it should be noted that the marginal relay R420 is also operated in series with the line relay R450 over the above described loop circuit and, at its contacts 421, completes a circuit via the contacts 441 for operating the digit absorbing relay R430. As soon as the relay R430 operates, it locks itself via its contacts 432 to ground at contacts 421 and, at its contacts 433, it connects the control relay R440 to the grounded C conductor C493. Finally, at its contacts 431, the relay R430 interrupts a point in the circuit for the battery reversing relay R410. The relay R440 operates as a result of its connection to the grounded C conductor C493 and, at its contacts 443, locks itself to the last mentioned conductor over a circuit which is independent of the contacts 433. Finally, at its contacts 441, the relay R440 interrupts a point in the initial operating circuit for the relay R430. With the relays R420, R430 and R440 in the relay network 104A in their operated position as noted above, the marginal relay R420 may respond to subsequent impulses transmitted over the loop circuit to the line relay R450 but due to the slow-to-release characteristics of the digit absorbing relay R430, the latter relay remains in its operated position during any impulsing operation of the relay R420.

The last two digits of the called subscriber number are transmitted over the EC conductor C304 in order to control the line relay R340 and the last mentioned relay, at its contacts 341, controls the above described loop circuit in order to repeat the last two digits to the line relay R450 and the marginal relay R420. The line relay R450 in the connector 105 restores and reoperates in the usual manner under control of the impulses of the next to the last digit and, at its contacts 452, repeats the impulses to the vertical magnet of the connector 105. The vertical magnet controls the vertical stepping of the wipers 485 to 487, inclusive, to a level in the associated bank contacts terminating the particular called subscriber line conductors C488 to C490, inclusive. During the interdigital pause between the next to the last and the last digit, the connector automatically functions in the well known manner to prepare the circuit for the rotary magnet (not shown) so that the last mentioned magnet will respond, under control of the line relay R450, to the last digit of the called subscriber number. Consequently, the rotary magnet steps the wipers 485 to 487, inclusive, over the contacts in the selected level to engage the particular contacts terminating the called subscriber line. When this occurs, assuming that the called line is idle, the switchthrough relay R480 in the connector 105 operates and at its contacts 481 and 482 it causes the transmission of ringing current over the called subscriber line to signal the called subscriber substation. Also at its contacts 484, the relay R480 connects ground potential via the wiper 487 to the C conductor C490 in order to control the line circuit of the called line in a conventional manner and in order to mark the called line busy.

As previously noted, the marginal relay R420 may respond to the impulses of the next to the last and the last digits transmitted to the connector 105 but due to the slow-to-release characteristics of the relay R430, the last mentioned relay remains in its operated position. However, as an added precaution, the electrolytic condenser 422 is bridged across the winding of the relay R420 in order to prevent the last mentioned relay from restoring to normal long enough to inadvertently restore the relay R430 when the relay network 104A is connected to a high impedance line. In the present example, the relay network 104A is connected in a low impedance line circuit and consequently, the condenser 422 has little or no effect upon the operating characteristics of the relay R420.

As previously noted, the switchthrough relay R480 in the connector 105 causes the transmission of ringing current to the called subscriber substation. In addition to the foregoing, the relay R480, at its contacts 483, removes the direct ground potential from the lower winding of the line relay R450 and thereby removes the short-circuit from the high resistance 460. As a result of the last mentioned operation, the high resistance 460 is now included in the previously traced loop circuit including the windings of the line relay R450, the marginal relay R420 and the left hand winding of the answer relay R310. The value of the resistance 460 is sufficient to cause the marginal relay R420 to restore, but it is insufficient to restore the line relay R450. In response to the restoration of the marginal relay R420, the circuit is interrupted at the contacts 421 for the digit absorbing relay R430. The latter relay slowly restores to normal and, at its contacts 431, prepares a point in the circuit for the battery reversing relay R410.

When the called subscriber at substation T answers the call, a ring-cut-off relay (not shown) in the connector 105 operates in order to disconnect the ringing current from the called subscriber line and in order to connect the upper and lower windings of the back bridge relay R470 via the contacts 481 and 482 and the wipers 485 and 486 to the — and + conductors C488 and C489 of the called subscriber line. As a result of the foregoing, the back bridge relay R470 now operates over the loop circuit including the called subscriber line conductors C488 and C489 and the called subscriber substation instrument. As soon as the relay R470 operates, it completes, at its contacts 471, a circuit for again applying a direct ground potential to the lower winding of the line relay R450 in order thereby to short-circuit the high resistance 460. Since the high resistance 460 is now removed from the previously traced loop circuit for the windings of the relay R450 and the marginal relay R420, the last mentioned relay reoperates. At this time, the reoperation of the marginal relay R420 completes a circuit via the contacts 421, 442 and 431 for operating the battery reversing relay R410. At its contacts 411 to 414, inclusive, the relay R410 now reverses the connections between the line conductors C491 and C492 and the line conductors C497 and C498. This reversal in the connection of the above noted line conductors reverses the direction of the current flow through the left hand winding of the answer relay R310 in the relay network 108. In other words, the left hand winding of the answer relay R310 is now energized in the same direction as the energizing circuit for the right hand winding of the relay and thereby causes the relay to operate its contacts 311 and 312. The contacts 311 of the relay R310 removes the line termination network including the condenser 324 and the resistor 323 from across the line conductors C355 and C356 and the contacts 312 complete an obvious circuit for operating the supervisory relay R350. As soon as the relay R350 operates, it removes ground potential, at its contacts 351, from the low resistance lower winding of the line relay R340 and simultaneously therewith, at its contacts 352, it connects ground potential via the high resistance upper winding and the low resistance lower winding of the line relay R340, in series, to the EC conductor C304. The substitution of the high resistance for the low resistance returned over the EC conductor C304 to the operator position 2200 gives the operator thereat an "off hook" answer supervisory signal. In passing, it should be noted that the impulse sender at the operator position, having completed the transmission of the called subscriber number over the EC conductor C1403, has disconnected itself from the last mentioned conductor and has substituted a supervisory relay at the operator position. Upon receipt of the answering supervisory signal, the operator at position 2200 may converse with the called subscriber at substation T over the established connection including the line conductors C1401 and C1402 of the toll preselector 1400, the line conductors C302 and C303, the inductively coupled windings of the repeating coil 301, the line conductors C355 and C356, the line conductors C491 and C492, the line conductors C497 and C498 and the line conductors C488 and C489 of the called subscriber line. It should be noted, however, that the resistor 423 is bridged around the winding of the relay R420 in order to provide a talking path which is independent of the winding of the relay R420.

The established connection is held under control of the operator at the operator position 2200, by battery potential forwarded over the EC conductor C304 to the line relay R340 and by ground potential forwarded over the C conductor C1404 to the toll preselector 1400. It will be recalled, however, that the preselector 1400, in turn, forwards a holding ground potential over the C conductor C305 to the control relay R330.

Before describing the release of the established connection, it will be assumed that the called subscriber at substation T momentarily actuates the switchhook in order to signal the calling operator. Each time the switchhook is momentarily depressed, the back bridge relay R470 is momentarily restored to normal and, at its contacts 471, momentarily inserts the high resistance 460 in the previously described loop circuit including the relays R420 and R450. The relay R420, as previously noted, restores to normal each time the resistance 460 is included in the loop circuit and it reoperates each time the resistance 460 is short-circuited. Consequently, at its contacts 421, the relay R420 restores and reoperates the battery reversing relay R410 and the latter relay, at its contacts 411 to 414, inclusive, alternately controls the direction of current flow over the line conductors from the reverse direction to the normal direction thereby to cause the answer relay R310 to momentarily restore and reoperate. As a result of the foregoing, the answer relay, at its contacts 310, momentarily interrupts the circuit for the supervisory relay R350 and the latter relay, at its contacts 351 and 352, alternately returns low and high resistance ground potential over the EC conductor C304 in order to transmit the switchhook supervisory signals to the calling operator at position 2200.

It will now be assumed that the called subscriber at substation T releases the connection by hanging up the receiver on the associated switchhook. As a result of the last mentioned operation, the back bridge relay R470 in the connector 105 restores to normal and, at its contacts 471, inserts the resistance 460 in the previously traced loop circuit. Consequently, the relay R420 restores to normal and, at its contacts 421, interrupts the circuit for battery reversing relay R410. The relay R410, at its contacts 411 and 414, inclusive, reestablishes the normal current flow over the loop circuit and thereby causes the answer relay R310 in the relay network 108 to restore to normal. The last mentioned relay, at its contacts 312, interrupts the circuit for the supervisory relay R350 which relay now restores and, at its contacts 351, substitutes the low resistance ground, including the lower winding of the relay R340, for the high resistance ground, including the high resistance upper winding and the low resistance lower winding of the line relay R340, on the EC conductor C304. This substitution returns a steady low resistance "on hook" supervisory signal to the operator position 2200 in order to indicate to the operator thereat that the called subscriber has released. The toll operator at position 2200 may now release the established connection by actuating a release key associated with the link 1300 thereby to remove the battery potential from the EC conductor C1403 and in order to remove the ground potential from the C conductor C1404. As a result of the removal of ground potential from the C conductor C1404, the switching relay R1460 in the toll preselector 1400 restores to normal thereby to remove the direct ground potential from the C conductor C305 extending to the relay network 108. As a further result of the restoration of the switching relay R1460, the release magnet (not shown) in the toll preselector 1400 is actuated thereby to cause the wiper set including the wipers 1493 to 1495, inclusive, and 1497, to restore to their normal resting positions and render the toll preselector 1400 available for additional calls in the manner described in the previously mentioned Balzer application.

Referring now to the relay network 108, it will be seen that when the battery potential is removed from the EC conductor C304, the line relay R340 thereat restores to normal and, at its contacts 341, interrupts the loop circuit for the line relay R450 in the connector 105. As a further result of the restoration of the line relay R340, at its contacts 343, it interrupts the circuit for the slow-to-release hold relay R330 which also restores to normal. During the restoration period of the hold relay R330, a circuit is completed for the dial relay R320 but operation of the relay R320 at this time is of no importance. As soon as the ground potential is removed from the control conductor C305, the control relay R360 in the relay network 108 restores to normal and connects the winding of the supervisory relay R350 via the contacts 364 to the C conductor C358 extending to the selector 109. At this time, the supervisory relay R350 may be operated from ground potential at the contacts 456 in the connector 105 returned over the C conductor C493. In other words, the supervisory relay R350 will be retained in its operated position until the connector 105 has fully restored to normal. As previously noted, the relay R350, in its operated position, returns a high resistance ground potential to the EC conductor C304 but in addition thereto, at its contacts 354, it now connects ground, at contacts 362, to the C conductor C305. The application of ground potential to the C conductor C305, at the present time, maintains a busy marking ground potential on this conductor in order to prevent another toll preselector, such as 1400, from seizing a relay network 108 until the switching apparatus employed in the present connection has been restored to normal. In addition to the foregoing, the ground potential returned over the conductor C493 via the wiper 403 and the contacts 395 and 376 to the C conductor C358 retains the switchthrough relay R370 in the selector 109 in its operated position. Therefore, the selector 109 cannot restore its wiper sets to their normal positions until the switchthrough relay R370 is restored to normal.

Referring now to the connector 105, it will be recalled that the line relay R450 was retained in its operated position over the previously traced loop circuit including the relay network 108. Consequently, when the line relay R340 restores to normal, as previously noted, it interrupts, at its contacts 341, a point in the above mentioned loop circuit and thereby causes the line relay R450 to restore to normal. Upon restoring, the relay R450 interrupts, at its contacts 451, the circuit for the slow-to-release hold relay R455. The latter relay, upon restoring to normal, interrupts a point in the circuit for the switchthrough relay R480 which also restores to normal. In addition to the foregoing, the hold relay R455 completes a circuit (not shown) including the contacts 452 for operating the release magnet of the connector 105, which magnet causes the wipers 485 to 487, inclusive, to restore to their normal positions. Incident to the restoration of the relay R455, at its contacts 456, it removes the holding ground potential from the C conductor C493 and thereby causes the control relay R440 in the relay network 104A, the switchthrough relay R370 in the selector 109 and the supervisory relay R350 in the relay network 108 to restore to normal. The restoration of the control relay R440 prepares, at its contacts 441, a point in the circuit for controlling the digit absorbing relay R430. Consequently, the relay network 104A and the connector 105 are now in condition to be utilized in another call. In the selector 109 the restoration of the switchthrough relay R370 completes a circuit, at its contacts 375, for operating the release magnet (not shown) in order to cause the wiper sets including the wipers 401 to 406, inclusive, to restore to their normal resting positions. In addition to the foregoing, the switchthrough relay R370, at its contacts 371 and 373, reconnects the windings of the line relay R380 to the line conductors C355 and C356. Consequently, the selector 109 is fully restored to normal and is rendered available for an additional call. In the associated relay network 108 the restoration of the supervisory relay R350 removes the busy marking ground potential from the C conductor C305, at its contacts 354; it connects the low resistance lower winding of the line relay R340 to the EC conductor C304, at its contacts 351; and, at its contacts 353, it reconnects the control relay R360 to the C conductor C305. All of the switching apparatus involved in the established connection between the calling operator at position 2200 and the called subscriber substation T are now restored to normal and rendered available for additional calls.

In the previous description of the operation of the relay network 108 and the selector 109 under control of the impulse sender at the operator position 2200, it was assumed that the selector 109 seized the relay network 104A over the incoming trunk conductors C491 to C493, inclusive, by utilizing the first wiper set including the wipers 401 to 403, inclusive. It will now be assumed that the wiper switching relay R390 is in its operated position at the time the selector 109 rotates its wipers over a selected level. Consequently, the second wiper set including the wipers 404 to 406, inclusive, will be rendered effective to search for an idle trunk line terminating a connector, such as the connector 106. With the wiper switching relay R390 in its operated position, the contacts 392, 394 and 396 are closed and the latter contact completes a testing circuit for controlling the rotary stepping of the wipers until an idle trunk line is seized. For the purpose of this description, it will be assumed that the connector 106 is idle and therefore no busy marking ground potential will be applied to the incoming trunk line C conductor C496. Consequently, when the selector 109 engages the idle connector 106, the switchthrough relay R370 will be operated, in the manner previously described, in order to extend the operating loop circuit from the relay network 108 to the line relay R520 in the connector 106. This loop circuit may be traced from battery via the upper winding of the relay R520, the contacts 511, the − conductor C494, the wiper 404, the contacts 392 and 372, the − conductor C355, the contacts 331, the upper right hand winding of the repeating coil 301, the left hand winding of the answer relay R310, the lower right hand winding of the repeating coil 301, the contacts 341, the + conductor C358, the contacts 374 and 394, the wiper 405, the + conductor C495, the contacts 513 and the lower winding of the line relay R520, to ground. The line relay R520 operates over the above traced loop circuit and in response to the last two digits of the called subscriber number selectively controls the vertical and rotary magnets (not shown) to position the wipers 531 to 533, inclusive, into engagement with the associated contact set terminating the called subscriber line. The connector thereafter tests the called line to determine whether it is idle or busy and, if idle, transmits the ringing current to signal the subscriber at substation T1. When the called subscriber answers the connection, a loop circuit including the line conductors C534 and C535 is completed for operating the back bridge relay R510 in the connector 106. Upon operating, the back bridge relay R510, at its contacts 511 to 514, inclusive, reverses the current flow over the line conductors C494 and C495 thereby to cause the operation of the answer relay R310, in the manner previously described.

In view of the previous description of the operation of the relay network 108, it will be understood that the operation of the answer relay R310 causes the operation, in turn, of the supervisory relay R350 and that the latter relay causes the transmission of a high resistance "off hook" answer supervisory signal back over the EC conductor C304 to the calling operator. The calling operator at position 2200 and the called subscriber at substation T1 may now converse over the established connection including the link 1300, the toll preselector 1400, the relay network 108, the selector 109 and the connector 106.

The remaining operations of the switching apparatus included in the above described connection whereby switchhook supervision and disconnect supervision are transmitted to the calling operator are the same as has been described except that the back bridge relay R510 in the connector 106 is directly controlled by the called subscriber in order to control the answer relay R310 in the relay network 108. The principal difference between the connector 105 and the connector 106 is that the former controls the transmission of supervision by including or excluding a high resistance in the loop circuit for the line relay R450 whereas the latter connector controls the transmission of supervision by reversing the direction of current flow over the loop circuit for the line relay R520.

The release of the established connection is under control of the calling operator at position 2200 and since the releasing operations of the apparatus included in the connection to the called subscriber at substation T1 are exactly the same as described above in releasing a connection to the called subscriber at substation T, they need not be repeated.

In the setting up of a connection to either the called subscriber at substation T or the called subscriber at substation T1, the selector 109 automatically rotated its wiper sets over the contacts of a selected level to search for an idle trunk line over the first wiper set including the wipers 401 to 403, inclusive, or over the second wiper set including the wipers 404 to 406, inclusive, depending upon whether the wiper switching relay R390 is in its restored position or in its operated position. In either event, if the selector 109 fails to find an idle trunk line in the selected level, the wiper sets will be rotated to the eleventh rotary step position. In other words, when all of the trunks in a selected level are busy at the time the wiper sets are rotated over the selected level, the wipers will be stepped to the eleventh rotary step position and operate the cam springs CAM397. As soon as the cam springs CAM397 are closed, ground pulses at the rate of 120 impulses per minute applied to the conductor C398 are transmitted via the resistor 399, the EC conductor C357 and the contacts 363 to the winding of the supervisory relay R350. The supervisory relay R350 will operate and restore under control of the ground pulses transmitted over the above traced circuit and alternately open and close its contacts 351 and 352. As previously noted, these contacts are connected in the circuits for the upper and lower windings of the relay R340 so that either a low resistance or a high resistance ground potential is returned over the EC conductor C304 to the operator position 2200. At the present time, due to the all-trunks-busy condition encountered by the selector 109, the supervisory relay R350 operates and restores at the rate of 120 times per minute. Consequently, at its contacts 351 and 352, it will alternately return high and low resistance ground potential over the EC conductor C304 to the impulse sender in the operator position 2200. Attention is directed to the fact that the impulse sender is still connected inasmuch as it has not completed the transmission of the last two digits of the called subscriber number. The alternate high and low resistance ground potential returned over the EC conductor C304 controls the impulse sender to give the operator at position 2200 an all-trunks-busy flashing signal to indicate that the desired connection cannot be established at the present time.

When the calling operator receives the all-trunks-busy flashing condition, she releases the partially established connection in the manner previously described, thereby to cause the restoration of the toll preselector 1400 and the restoration of both the line relay R340 and the control relay R360 in the relay network 108. As soon as the line relay R340 restores to normal, it interrupts, at its contacts 341, the previously traced loop circuit for the line relay R380 which relay now restores to normal and interrupts the circuit for the hold relay R385. The latter relay slowly restores to normal and completes a circuit for operating the release magnet (not shown) of the selector 109 thereby to cause the wiper sets thereof to restore to their normal resting positions. As soon as the wipers start to restore to normal, the cam springs CAM397 are opened thereby to disconnect the 120IPM conductor C398 from the EC conductor C357. In view of the foregoing, it will be understood that when an all-trunks-busy condition is encountered by the selector 109 during the setting up of a connection, the supervisory relay R350 is controlled to transmit a distinctive all-trunks-busy signal to the calling operator over the EC conductor C304.

While one embodiment of the invention has been disclosed it will be understood that various modifications may be made therein which are within the true spirit and scope of the invention.

What is claimed is:

1. In a telephone system, an automatic switch comprising an incoming trunk line including a pair of line conductors and a control conductor and an extra control conductor, a first line relay provided with a first low resistance winding and a second high resistance winding, a source of first potential, a first connection from said source of first potential via said first winding to said extra control conductor, a second connection from said source of first potential via said second and first windings in series to said extra control conductor, a supervisory relay having a restored position completing said first connection and interrupting said second connection and having an operated position completing said second connection and interrupting said first connection, a source of second potential adapted to be selectively connected to said extra control conductor in order selectively to energize said first winding or said first and second windings depending upon the completion of said first or said second connections respectively, said first line relay being operated when either said first winding is energized or said first and second windings are energized, a second line relay provided with first and second windings, a loop circuit adapted to be selectively connected to said first and second windings of said second line relay in order selectively to energize said windings in series, means responsive to initial operation of said first line relay in response to initial connection of said source of second potential to said extra control conductor for connecting said loop circuit to said windings of said second line relay in order to operate said second line relay, a wiper set, a line accessible to said wiper set, means responsive to restoration and reoperation of said first line relay in response to one or more interruptions of said source of second potential connected to said extra control conductor in accordance with the impulses of a first digit for interrupting said loop circuit in order to restore and reoperate said second line relay a corresponding number of times, means responsive to restoration and reoperation of said second line relay for operating said wiper set to select said line, means responsive to selection of said line by said wiper set for connecting said loop circuit to said line via said wiper set, and means included in said loop circuit controlled responsive to an answer control returned from said line to said loop circuit for operating said supervisory relay and controlled responsive to a disconnect control returned from said line to said loop circuit for restoring said supervisory relay.

2. In a telephone system, an automatic switch comprising an incoming trunk line including a pair of line conductors and a control conductor and an extra control conductor, a first line relay provided with a first low resistance winding and a second high resistance winding, a source of first potential, a first connection from said source of first potential via said first winding to said extra control conductor, a second connection from said source of first potential via said second and first windings in series to said extra control conductor, a supervisory relay having a restored position completing said first connection and interrupting said second connection and having an operated position completing said second connection and interrupting said first connection, a source of second potential adapted to be selectively connected to said extra control conductor in order selectively to energize said first winding or said first and second windings depending upon the completion of said first or said second connections respectively, said first line relay being operated when either said first winding is energized or said first and second windings are energized, a second line relay provided with first and second windings, an impulsing bridge circuit adapted to be selectively connected in series with said first and second windings of said second line relay, means controlled responsive to initial operation of said first line relay in response to initial connection of said source of second potential to said extra control conductor for connecting said impulsing bridge to said second line relay in order to operate said second line relay, a wiper set, a line accessible to said wiper set, means responsive to subsequent restoration and reoperation of said first line relay in response to one or more interruptions of said source of second potental connected to said extra control conductor in accordance with the impuses of a first digit for interrupting said impulsing bridge in order to restore and reoperate said second line relay a corresponding number of times, means responsive to restoration and reoperation of said second line relay for operating said wiper set to select said line, means controlled in response to said selection of said line by said wiper set for connecting said impulsing bridge to said line via said wiper set, an answer relay included in said impulsing bridge controlled responsive to an answer control returned from said line to said impulsing bridge for operating said supervisory relay to complete said second connection and to interrupt said first connection in order to alter the resistance returned over said extra control conductor from low to high, and said answer relay controlled in response to a disconnect control returned from said line to said impulsing bridge reoperating said supervisory relay to recomplete said first connection and interrupt said second connection in order to alter the resistance returned over said extra control conductor from high to low.

3. In a telephone system, an automatic switch comprising an incoming trunk line including a pair of line conductors and a control conductor and an extra control conductor, a first line relay provided with first and second windings that are respectively of low resistance and high resistance with respect to each other, a source of first potential, a first connection from said source of first potential via said first winding to said extra control conductor, a second connection from said source of first potential via said second and first windings in series to said extra control conductor, a supervisory relay having a restored position completing said first connection and interrupting said second connection and having an operated position completing said second connection and interrupting said first connection, a source of second potential adapted to be selectively connected to said extra control conductor in order selectively to energize said first winding or said first and second windings depending upon the completion of said first or said second connections respectively, said first line relay being operated when either said first winding is energized or said first and second windings are energized, a second line relay provided with first and second windings, an impulsing bridge circuit adapted to be selectively connected in series to said first and second windings of said second line relay, means controlled responsive to initial operation of said first line relay in response to initial connection of said source of second potential to said extra control conductor for connecting said impulsing bridge circuit to said second line relay in order to operate said second line relay, a wiper set, a group of lines accessible to said wiper set, means responsive to subsequent restoration and operation of said first line relay in response to one or more impulses of said source of second potential connected to said extra control conductor for controlling said impulsing bridge circuit to restore and reoperate said second line relay a corresponding number of times, means responsive to restoration and reoperation of said second line relay for operating said wiper set to select said group of lines and for controlling said wiper set to select an idle one of said lines in said group, means controlled in response to said selection of said idle line for connecting said impulsing bridge circuit to said selected line via said wiper set, an answer relay included in said impulsing bridge circuit operated responsive to an answer control on said selected line, means controlled in response to said operation of said answer relay for operating said supervisory relay, and a busy device in said switch operated in response to a busy condition of all of said lines in said group for intermittently operating and restoring said supervisory relay.

4. In a telephone system, an automatic switch comprising an incoming trunk line including a pair of line conductors and a control conductor and an extra control conductor, a first line relay provided with first and second windings that are respectively of low resistance and high resistance with respect to each other, a source of first potential, a first connection from said source of first potential via said first winding to said extra control conductor, a second connection from said source of first potential via said second and first windings in series to said extra control conductor, a supervisory relay having a restored position completing said first connection and interrupting said second connection and having an operated position completing said second connection and interrupting said first connection, a source of second potential adapted to be selectively connected to said extra control conductor in order selectively to energize said first winding or said first and second windings depending upon the completion of said first or said second connections respectively, said first line relay being operated when either said first winding is energized or said first and second windings are energized, a second line relay provided with first and second windings, an impulsing bridge circuit adapted to be selectively connected in series to said first and second windings of said second line relay, means controlled responsive to initial operation of said first line relay in response to initial connection of said source of second potential to said extra control conductor for connecting said impulsing bridge circuit to said second line relay in order to operate said second line relay, a wiper set, a group of lines accessible to said wiper set, means responsive to subsequent restoration and operation of said line relay in response to one or more impulses of said source of second potential connected to said extra control conductor for controlling said impulsing bridge circuit to restore and reoperate said second line relay a corresponding number of times, means responsive to restoration and reoperation of said second line relay for operating said wiper set to select said group of lines and for controlling said wiper set to select an idle one of said lines in said group, means controlled in response to said selection of said idle line for connecting said impulsing bridge circuit to said selected line via said wiper set, an answer relay included in said impulsing bridge circuit operated responsive to an answer control on said selected line, means controlled in response to said operation of said answer relay for selectively operating said supervisory relay in order to complete said second connection and thereby return a high resistance answer supervisory signal over said extra control conductor, a busy device in said switch operated in response to a busy condition of all of said lines in said group for intermittently operating and restoring said supervisory relay in order intermittently to complete said second and said first connection and thereby intermittently return a high resistance and low resistance busy supervisory signal over said extra control conductor.

5. In a telephone system, an automatic switch comprising an incoming trunk line including a pair of line conductors and a control conductor and an extra control conductor, a first line relay provided with first and second windings that are respectively of low resistance and high resistance with respect to each other, a source of first potential, a first connection from said source of first potential via said first winding to said extra control conductor, a second connection from said source of first potential via said second and first windings in series to said extra control conductor, a supervisory relay having a restored position completing said first connection and interrupting said second connection and having an operated position completing said second connection and interrupting said first connection, a source of second potential adapted to be selectively connected to said extra control conductor in order selectively to energize said first winding or said first and second windings depending upon the completion of said first or said second connections respectively, said first line relay being operated when either said first winding is energized or said first and second windings are energized, a second line relay provided with first and second windings, an impulsing bridge circuit adapted to be selectively connected in series to said first and second windings of said second line relay, means controlled responsive to initial operation of said first line relay in response to initial connection of said source of second potential to said extra control conductor for connecting said impulsing bridge circuit to said second line relay in order to operate said second line relay, a wiper set, a group of lines accessible to said wiper set, means responsive to subsequent restoration and operation of said first line relay in response to one or more impulses of said source of second potential connected to said extra control conductor for controlling said impulsing bridge circuit to restore and reoperate said second line relay a corresponding number of times, means responsive to restoration and reoperation of said second line relay for operating said wiper set to select said group of lines and for controlling said wiper set to select an idle one of said lines in said group, means controlled in response to said selection of said idle line for connecting said impulsing bridge circuit to said selected line via said wiper set, an answer relay included in said impulsing bridge circuit operated responsive to an answer control on said selected line, means controlled in response to said operation of said answer relay for selectively operating said supervisory relay in order to complete said second connection and thereby return a steady high resistance answer supervisory signal over said extra control conductor, off-normal contacts in said switch operated responsive to a busy condition encountered by said wiper set on all of said lines in said group, and means including said operated off-normal contacts for intermittently controlling said supervisory relay to alternately complete said second and said first connections and thereby alternately return a high resistance and a low resistance busy supervisory signal over said extra control conductor.

6. In a telephone system, a first automatic switch comprising an incoming trunk line including a pair of line conductors and a control conductor and an extra control conductor, a second automatic switch comprising an incoming trunk line including a pair of line conductors and a control conductor, a wiper set for each of said switches each including a pair of line wipers and a control wiper, a first line relay connected to the extra control conductor of said first switch incoming trunk line selectively controlled in accordance with switch setting impulses of digits transmitted thereto, a control relay connected to the control conductor of said first switch incoming trunk line and operated thereover, a second line relay connected to the line conductors of said second switch incoming trunk line, an additional line relay in said first switch, means controlled in response to the selective control of said first line relay in accordance with a first digit for selectively controlling said additional line relay, means controlled in response to said selective control of said additional line relay for selectively operating said first switch wiper set to select said second switch incoming trunk line, means controlled in response to the selective control of said first line relay in accordance with additional digits for selectively controlling said second line relay over the line wipers of said wiper set and the line conductors of said second switch incoming trunk line, means controlled by said control relay responsive to said selection of said second switch incoming trunk line for applying a control potential to said control conductor of said second switch incoming trunk line by way of said first switch control wiper, a called line accessible to said second switch wiper set, means controlled in response to said selective control of said second line relay for operating said second switch wiper set to select said called line, means controlled in response to said selection of said called line for connecting a high resistance to one of said line conductors of said second switch incoming trunk line and for removing said high resistance therefrom in response to an answer on said called line, means controlled in response to said connection and subsequent disconnection of said high resistance for transmitting an answer supervisory signal to said first switch over the line wipers of said first switch wiper set, an answer relay in said first switch operated responsive to said answer supervisory signal, and means controlled in response to said operation of said answer relay for returning an answer supervisory signal over the extra control conductor of said first switch incoming trunk line.

7. In a telephone system, a first automatic switch comprising an incoming trunk line including a pair of line conductors and a control conductor and an extra control conductor, a second automatic switch comprising an incoming trunk line including a pair of line conductors and a control conductor, a wiper set for each of said switches each including a pair of line wipers and a control wiper, a first line relay connected to the extra control conductor of said first switch incoming trunk line selectively controlled in accordance with switch setting impulses of digits transmitted thereto, a control relay connected to the control conductor of said first switch incoming trunk line and operated thereover, a second line relay connected to the line conductors of said second switch incoming trunk line, an additional line relay in said first switch, an impulsing bridge in said first switch, means controlled in response to the selective control of said first line relay in accordance with a first digit for selectively connecting said impulsing bridge to said additional line relay in order selectively to control said additional line relay in accordance with said first digit, means controlled in response to said selective control of said additional line relay for selectively operating said first switch wiper set to select said second switch incoming trunk line, means in said first switch controlled in response to said selection of said second switch incoming trunk line for connecting said second line relay via the line conductors of said second switch incoming trunk line and the line wipers of said first switch wiper set to said impulsing bridge, means controlled by said control relay responsive to said selection of said second switch incoming trunk line for applying a control potential to said control conductor of said second switch incoming trunk line by way of said first switch control wiper, means controlled in response to the selective control of said first line relay in accordance with additional digits for selectively controlling said impulsing bridge to repeat said additional digits to said second line relay, a called line accessible to said second switch wiper set, means controlled by said second line relay in response to said additional digits for selectively operating said second switch wiper set to select said called line, means controlled in response to said selection of said called line for inserting a high resistance in one of said line conductors of said second switch incoming trunk line, means controlled in response to an answer signal on said called line for removing said high resistance from said one line conductor of said second switch incoming trunk line, means connected to one of said line conductors of said second switch incoming trunk line selectively controlled in response to said insertion and subsequent removal of said high resistance for reversing said connection of said second line relay to said second switch incoming line conductors, a relay in said impulsing bridge operated responsive to said reversal, and means controlled in response to said operation of said relay for altering the connection of said first line relay to the extra control conductor of said first switch incoming trunk line in order to transmit an answer supervisory signal over said extra control conductor.

8. In a telephone system, a first automatic switch comprising an incoming trunk line including a pair of line conductors and a control conductor and an extra control conductor, a wiper set for said first switch, an outgoing trunk line including a pair of line conductors and a control conductor accessible to said wiper set, a second automatic switch connected to said outgoing trunk line, a wiper set for said second switch having access to called lines, a control relay connected to the control conductor of said first switch incoming trunk line and operated thereover, means in said first switch selectively controlled in accordance with impulses of a first digit transmitted thereto over the extra control conductor of said incoming trunk line for operating said first switch wiper set to select said outgoing trunk line, means controlled by said control relay responsive to said selection of said outgoing trunk line for applying a control potential to said control conductor of said outgoing trunk line, a line relay in said second switch connected to the line conductors of said outgoing trunk operated responsive to said selection, means in said first switch selectively controlled in accordance with impulses of subsequent digits transmitted thereto over the extra control conductor of said incoming trunk line for selectively operating said line relay over a circuit including the line conductors of said outgoing trunk line, means controlled in accordance with said selective operation of said line relay for selectively operating said second switch wiper set to select one of said called lines, means in said second switch controlled responsive to said selection of said called line for connecting a high resistance to one of the line conductors of said outgoing line and controlled by a subsequent answer signal returned over said called line for disconnecting said high resistance from said one line conductor of said outgoing line, means connected to the other line conductor of said outgoing trunk line normally operated in series with said line relay restored and reoperated responsive to said connection and disconnection of said high resistance to said one line conductor of said outgoing line for transmitting an answer supervisory signal to said first switch over the line conductors of said outgoing trunk line, and means in said first switch controlled responsive to said last mentioned signal for returning said answer supervisory signal over said extra control conductor of said incoming trunk line.

9. In a telephone system, a first automatic switch comprising an incoming trunk line including a pair of line conductors and a control conductor and an extra control conductor, a wiper set for said first switch, an outgoing trunk line including a pair of line conductors and a control conductor accessible to said wiper set, a second automatic switch connected to said outgoing trunk line, a wiper set for said second switch having access to called lines, a control relay connected to the control conductor of said first switch incoming trunk line and operated thereover, means in said first switch selectively controlled in accordance with impulses of a first digit transmitted thereto over the extra control conductor of said incoming trunk line for operating said first switch wiper set to select said outgoing trunk line, means controlled by said control relay responsive to said selection of said outgoing trunk line for applying a control potential to said control conductor of said outgoing trunk line a line relay in said second switch bridged across the line conductors of said outgoing trunk line, a marginal relay in said second switch connected in series with one of the line conductors of said outgoing trunk line, means in said first switch selectively controlled in accordance with impulses of subsequent digits transmitted thereto over the extra control conductor of said incoming trunk line for selectively operating said line relay and said marginal relay over a circuit including the line conductors of said outgoing line, means in said second switch selectively controlled by said line relay for selectively operating said second switch wiper set to select one of said called lines, means in said second switch selectively controlled by said marginal relay for conditioning said second switch to respond to return an answer condition on said called line, means in said second switch operated responsive to selection of said called line for including a resistance in said circuit of said line relay and said marginal relay, means in said second switch operated responsive to an answer condition on said called line for excluding said resistance from said circuit including said line relay and said marginal relay, said marginal relay restoring and reoperating in response to said inclusion and said exclusion of said resistance in said circuit, means controlled in response to said restoration and said reoperation of said marginal relay for transmitting an answering supervisory control over the line conductors of said outgoing trunk line to said first switch, and means in said first switch controlled responsive to said answering supervisory signal for repeating said signal over the extra control conductor of said incoming trunk line.

10. In a telephone system, a first automatic switch comprising an incoming trunk line including a pair of line conductors and a control conductor and an extra control conductor, a second automatic switch comprising an incoming trunk line including a pair of line conductors and a control conductor, a wiper set for each of said switches each including a pair of line wipers and a control wiper, a first line relay connected to the extra control conductor of said first switch incoming trunk line selectively controlled in accordance with switch setting impulses of digits transmitted thereto, a first control relay connected to the control conductor of said first switch incoming trunk line and operate thereover, a second line relay connected to the line conductors of said second switch incoming trunk line, a second control relay connectable to the control conductor of said second switch incoming trunk line, an additional line relay in said first switch, means controlled in response to the selective control of said first line relay in accordance with a first digit for selectively controlling said additional line relay, means controlled in response to said selective control of said additional line relay for selectively operating said first switch wiper set to select said second switch incoming trunk line, means operated in response to said selection of said second switch incoming trunk line for disconnecting said additional line relay, means controlled in response to operation of said first control relay for connecting a holding control via the control wiper of said first switch wiper set and the control conductor of said second switch incoming trunk line to the control wiper of said second switch wiper set, means controlled in response to the selective control of said first line relay in accordance with additional digits for selectively controlling said second line relay over the line wipers of said wiper set and the line conductors of said second switch incoming trunk line, a marginal relay also controlled over said line conductors of said second switch incoming trunk line, means controlled by said marginal relay for connecting said second control relay to the control conductor of said second switch incoming trunk line in order to operate said second control relay, a called line accessible to said second switch wiper set, means controlled in response to said selective control of said second line relay for operating said second switch wiper set to select said calling line, means controlled in response to said selection of said calling line for connecting a high resistance to one of said line conductors of said second switch incoming trunk line and for removing said high resistance therefrom in response to an answer on said called line, said marginal relay restoring to normal in response to the connection of said high resistance to said one line conductor of said second switch incoming trunk line and said marginal relay reoperating in response to the removal of said high resistance from said one line conductor of said second switch incoming trunk line, a reversing relay, means controlled in response to said restoration and reoperation of said marginal relay for completing a circuit including contacts of said operated second control relay for operating said reversing relay, means controlled in response to said operation of said reversing relay for returning an answer supervisory signal to said first switch over the line wipers of its wiper set, and means in said first switch controlled by said answer supervisory signal for repeating said signal over the extra control conductor of said first switch incoming trunk line.

11. In a telephone system, an automatic switch comprising an incoming trunk line including a pair of line conductors and a control conductor, a wiper set, a line, a line relay, means controllable over said line conductors for selectively operating said line relay, a marginal relay connected in series with one of said line conductors selectively operated in series with said line relay, means responsive to said selective operation of said line relay for selectively operating said wiper set to select said line, a reversing relay, a first relay and a second relay, means responsive to said selective operation of said marginal relay operating said first relay, means controlled by said operation of said first relay for operating said second relay, means controlled by said operation of said second relay for preparing a point in a circuit for said reversing relay, means operated responsive to said selection of said line for connecting a high resistance to one of said line conductors of said incoming trunk line in order to restore said marginal relay and said first relay, means controlled responsive to an answer control returned over said line for disconnecting said high resistance from said one line conductor of said incoming trunk line in order to reoperate said marginal relay, and means controlled responsive to said reoperation of said marginal relay for completing said circuit for operating said reversing relay in order to transmit an answer supervisory signal over the line conductors of said incoming trunk line.

HARVEY W. BALZER.
PIER BAKKER.

References Cited in the file of this patent

UNITED STATES PATENTS

| Number | Name | Date |
|---|---|---|
| 1,291,950 | Long | Jan. 21, 1919 |
| 1,577,083 | Sperry | Mar. 16, 1926 |
| 1,914,357 | Brooks | June 20, 1933 |
| 2,504,708 | Long | Apr. 18, 1950 |
| 2,579,721 | Bakker | Dec. 25, 1951 |